(12) United States Patent
Pesyna, Jr. et al.

(10) Patent No.: US 12,163,790 B2
(45) Date of Patent: Dec. 10, 2024

(54) ROUTE SMOOTHING WITH MAP MATCHED POSITIONING COORDINATES

(71) Applicant: Apple Inc., Cupertino, CA (US)

(72) Inventors: Kenneth M. Pesyna, Jr., Campbell, CA (US); Christina Selle, Los Altos, CA (US); Saurabh Godha, Santa Clara, CA (US); Isaac Thomas Miller, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 216 days.

(21) Appl. No.: 17/739,074

(22) Filed: May 6, 2022

(65) Prior Publication Data

US 2022/0390238 A1    Dec. 8, 2022

Related U.S. Application Data

(60) Provisional application No. 63/197,234, filed on Jun. 4, 2021.

(51) Int. Cl.
*G01C 21/30* (2006.01)

(52) U.S. Cl.
CPC .................... *G01C 21/30* (2013.01)

(58) Field of Classification Search
CPC ...................................................... G01C 21/30
See application file for complete search history.

(56) References Cited

U.S. PATENT DOCUMENTS

| | | | |
|---|---|---|---|
| 9,746,331 B1* | 8/2017 | Yu | G01S 19/42 |
| 2009/0030605 A1* | 1/2009 | Breed | G01S 17/86 |
| | | | 340/901 |
| 2017/0358204 A1* | 12/2017 | Modica | H04W 4/021 |
| 2019/0020530 A1* | 1/2019 | Au | H04W 72/21 |

* cited by examiner

*Primary Examiner* — Seth A Silverman
(74) *Attorney, Agent, or Firm* — BAKERHOSTETLER

(57) ABSTRACT

The subject technology provides for visualizing a route traversed by a user during a movement event by periodically obtaining position information data from a receiver of a navigation system during a movement event. A path traversed by a user of a device that includes the receiver during the movement event is estimated based on the position information data. One or more previously mapped features within a proximity of the estimated path on a map are determined. The estimated path is matched to the map based on the previously mapped features to obtain a map-matched path. A display device is caused to render the map-matched path on an image of the map.

20 Claims, 7 Drawing Sheets

ROUTE SMOOTHING WITH MAP MATCHED POSITIONING COORDINATES

CROSS-REFERENCE TO RELATED APPLICATIONS

The present application claims the benefit of priority to U.S. Provisional Patent Application Ser. No. 63/197,234, entitled "Route Smoothing with Map Matched Positioning Coordinates," filed Jun. 4, 2021, which is hereby incorporated by reference in its entirety for all purposes.

TECHNICAL FIELD

The present description relates generally to mapping of a route during an event during which movements are tracked, and in particular to visualization of the mapped route.

BACKGROUND

Medical science has established that regular physical activity is important to maintaining good health. Among those who do seek out exercise, there is often a desire to quantify their performance. Runners, walkers or cyclers who choose to exercise outdoors, for instance, want to track their movements on a map to determine how far they go while exercising.

A user may use portable device such as a wearable device for keeping track of movements during an event such as, for example, an outdoor exercise session. Some handheld devices such as, for example, mobile phones or wearable electronic devices may include navigation technology. A device with navigation capabilities may use signals from earth-orbiting navigation satellites such as those of a global positioning system (GPS) to ascertain the device's position. A GPS receiver gathers signals from the navigation satellites. GPS circuitry analyses data from the receiver to calculate the current position of the device. This circuitry may also be used to generate information on speed, direction of motion, and time. Thus, the movements of the user may be tracked using the navigation system onboard the wearable device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

An electronic device, such as a portable electronic device or a wearable electronic device may generate a track log corresponding to movement of the electronic device over a period of time, such as during an event (e.g., an exercise session). A track log may be a collection of track points along the course of a route of movements of the device. A track log can be created using data, such as GPS data obtained from an on-board navigation system, such as while the device moves along a route. Further, a track log can be saved in a track log file that lists one or more sequential coordinates in, for example, two-dimensional (2-D) or three-dimensional (3-D) space, such as latitude, longitude and elevation. The track log can be processed to obtain a path traversed by the user during the event, e.g., by joining together the track points. The path obtained by processing the track log may or may not represent the actual route (also referred to herein as the actual path) traversed by the user depending on how the track log is processed to obtain the path.

The accuracy of GPS measurements can be affected by the signal strength of a GPS signal. Thus, the signal strength of the GPS signal can limit the ability of an electronic device, at certain times and/or in certain environments, to obtain position information that accurately reflect the movement of the device.

Figure 1:
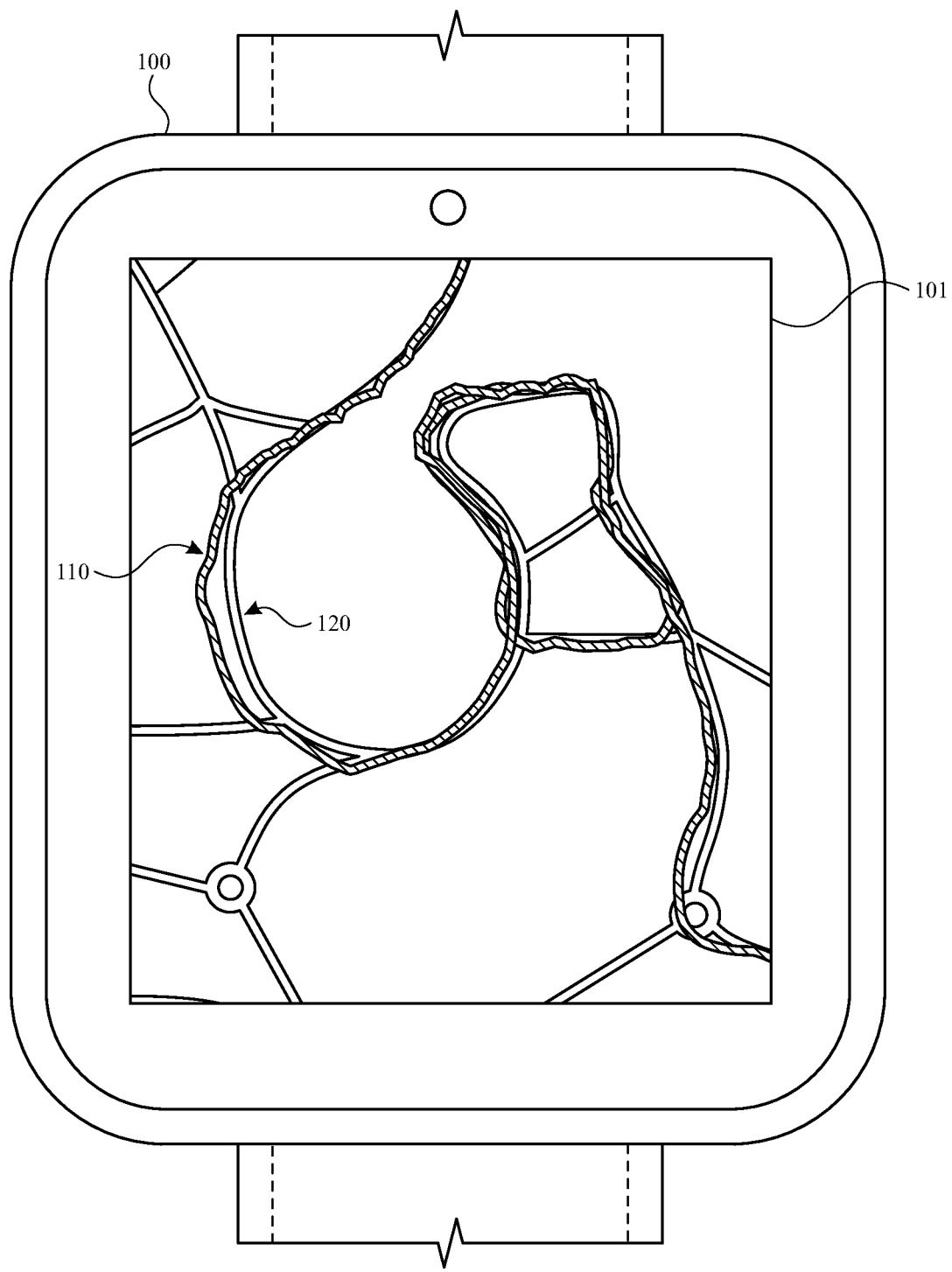
FIG. 1 shows an example of an electronic device displaying a path corresponding to raw GPS data in accordance with one or more implementations.

For example, FIG. 1 illustrates an example electronic device 100 displaying a rendering 101 of a path generated based on raw GPS data. Further, as can be seen in FIG. 1, a rendering based on raw GPS data may not accurately portray the actual path because of the noise inherent to the raw GPS data. For example, while the rendering 101 of the path may indicate that the electronic device 100 has traversed (e.g., while being carried or worn by a user) the path indicated by 110, the actual path of the electronic device 100 may lie on the route indicated by 120, which may correspond to a known trail, road or other pre-mapped feature on a map. In instances where the visualized path is used to estimate the distance traversed by the individual during the exercise session, such differences between the actual and visualized path over a long distance may result in an inaccurate estimation of the distance traversed by the electronic device.

Various aspects of the subject technology provide for improved visualization of a path traversed by an electronic device on a map during and/or following an event, e.g., an exercise session or workout, during which movements of the electronic device are tracked. The improved visualization can be provided by eliminating or reducing the effects of noise from raw GPS data in the visualization (e.g., using map matching and informed smoothing as described in further detail hereinafter) to provide a smoother and more accurate rendering of the path traversed by the electronic device during an event.

For example, in one or more implementations, aspects of the subject technology can further provide a more accurate rendering of the path traversed by the user during the event by accounting for previously mapped features such as roads, trails, foliage, building, and matching a path obtained from the raw GPS data to a map based on the previously mapped features. In one or more implementations, these map matching operations can depend on the signal environment in which the GPS data is obtained, described in further detailed hereinafter. For example, aspects of the subject technology may utilize known map features that can affect the GPS signal to determine the degree to which matching of the path to the mapped features is performed, to obtain a smoother and more accurate rendering of the path.

As another example, a workout type and/or a signal environment may be determined and/or provided, along with raw or map-matched GPS data, to a smoother at the electronic device. The smoother may adjust one or more settings based on the workout type and/or the signal environment, and smooth the raw or map-matched GPS data using the adjusted smoother settings, to obtain a smoother and more accurate rendering of the path. In one or more implementations, the smoother may be a fixed-lag smoother, and the adjustment of the smoother settings may include adjusting a process noise parameter of a constant velocity dynamics model of the fixed-lag smoother. For example, if a workout type indicates a bike ride, the smoother settings may be adjusted to increase smoothing of the map-matched GPS data relative to the smoother settings for a workout type corresponding to walk or run (e.g., because a bicycle is more likely to move along a smoother route and/or along paved or beaten paths than a person on foot). As another example, in a high noise signal environment (e.g., a downtown urban canyon), the smoother settings may be adjusted to increase smoothing of the map-matched GPS data relative to the smoother settings for a high-accuracy GPS signal environment (e.g., because differences in the high noise GPS data may be less likely to accurately reflect the movement/position of the electronic device than differences in the high-accuracy GPS data, and more aggressive smoothing of the differences in the high noise GPS data may thus be desirable).

Various aspects of the subject technology further provides for a more accurate estimation of distance traversed by the electronic device by improving the accuracy of the path. In one or more implementations, the subject method may be implemented by a processor or a processing subsystem of a portable user device such as, for example, a wearable device.

Figure 2:
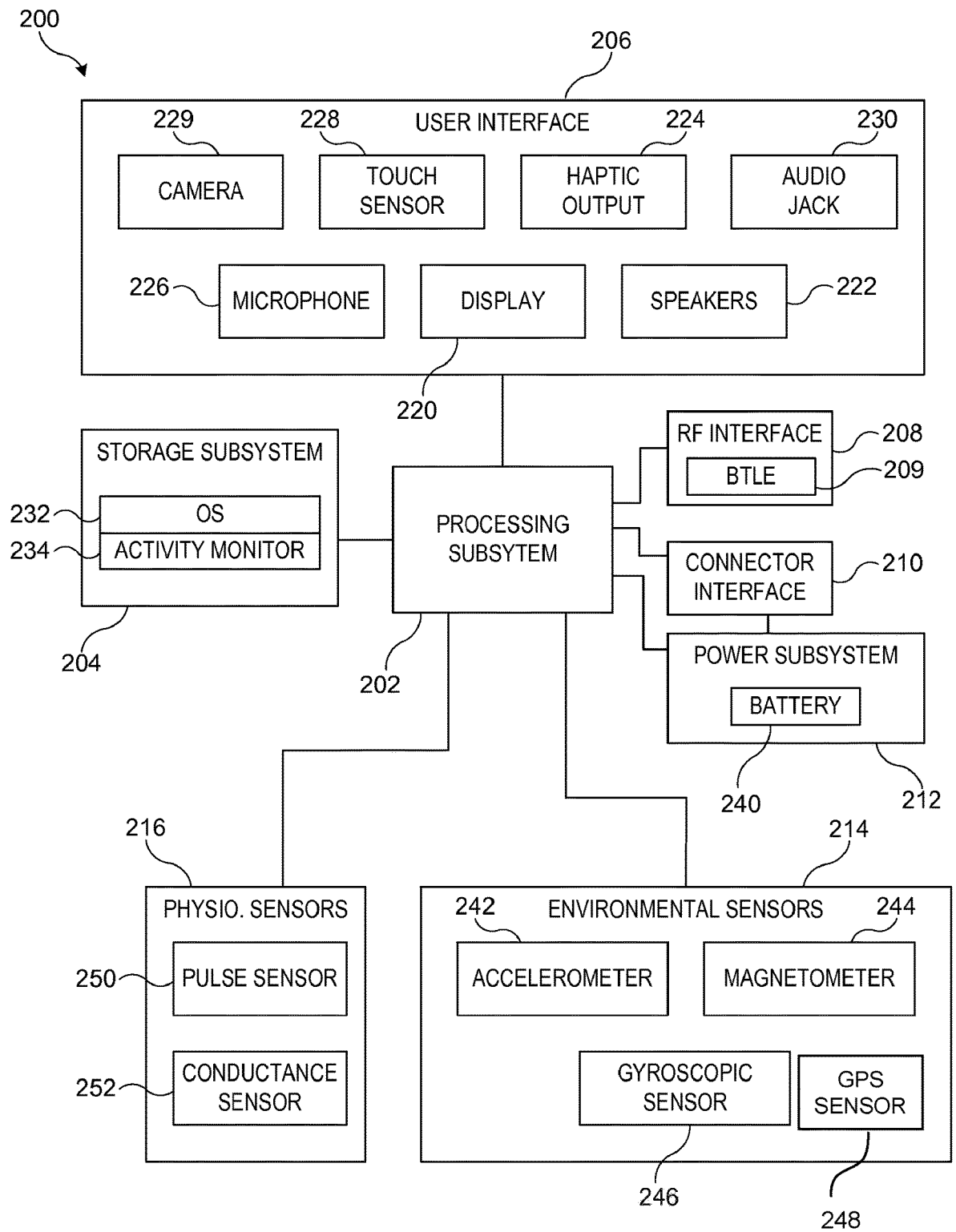
FIG. 2 shows a block diagram of an example user device that can be used for tracking movements of the device during an event, in accordance with one or more implementations.

FIG. 2 illustrates a block diagram of an example electronic device 200 (e.g., a portable electronic device such as a smartphone or a wearable electronic device such as a smart watch) that can be used for tracking movements of the user during an event, in accordance with one or more implementations. Electronic device 200 can include processing subsystem 202, storage subsystem 204, user interface 206, RF interface 208, connector interface 210, power subsystem 212, environmental sensors 214, and physiological sensors 216. Electronic device 200 can also include other components (not explicitly shown).

Storage subsystem 204 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 204 can store media items such as audio files, video files, image or artwork files; information about a user's contacts (names, addresses, phone numbers, etc.); information about a user's calendar (e.g., scheduled appointments and events; notes; and/or other types of information, examples of which are described below. In some embodiments, storage subsystem 204 can also store one or more application programs to be executed by processing subsystem 202 (e.g., video game programs, personal information management programs, media playback programs, fitness and/or wellness related programs, interface programs associated with particular host devices and/or host device functionalities, etc.).

User input/output interface 206 can include any combination of input and output devices. A user can operate input devices of user input/output interface 206 to invoke the functionality of electronic device 200 and can view, hear, and/or otherwise experience output from electronic device 200 via output devices of user input/output interface 206.

Examples of output devices include display 220, speakers 222, and haptic output generator 224. Display 220 can be implemented using compact display technologies, e.g., LCD (liquid crystal display), LED (light-emitting diode), OLED (organic light-emitting diode), or the like. In some embodiments, display 220 can incorporate a flexible display element or curved-glass display element, allowing electronic device 200 to conform to a desired shape. One or more speakers 222 can be provided using small-form-factor speaker technologies, including any technology capable of converting electronic signals into audible sound waves. In some embodiments, speakers 222 can be used to produce tones (e.g., beeping or ringing) and can but need not be capable of reproducing sounds such as speech or music with any particular degree of fidelity. Haptic output generator 224 can be, e.g., a device that converts electronic signals into vibrations; in some embodiments, the vibrations can be strong enough to be felt by a user wearing electronic device 200 but not so strong as to produce distinct sounds.

Examples of input devices include microphone 226, touch sensor 228, and camera 229. Microphone 226 can include any device that converts sound waves into electronic signals. In some embodiments, microphone 226 can be sufficiently sensitive to provide a representation of specific words spoken by a user; in other embodiments, microphone 226 can be usable to provide indications of general ambient sound levels without necessarily providing a high-quality electronic representation of specific sounds.

Touch sensor 228 can include, e.g., a capacitive sensor array with the ability to localize contacts to a particular point or region on the surface of the sensor and in some instances, the ability to distinguish multiple simultaneous contacts. In some embodiments, touch sensor 228 can be overlaid over display 220 to provide a touchscreen interface, and processing subsystem 202 can translate touch events (including taps and/or other gestures made with one or more contacts) into specific user inputs depending on what is currently displayed on display 220.

Camera 229 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in storage subsystem 204 and/or transmitted by electronic device 200 to other devices for storage. Depending on implementation, the optical components can provide fixed focal distance or variable focal distance; in the latter case, autofocus can be provided. In some embodiments, camera 229 can be disposed along an edge of face member, e.g., top edge, and oriented to allow a user to capture images of nearby objects in the environment such as a bar code or QR code. In other embodiments, camera 229 can be disposed on the front surface of face member, e.g., to capture images of the user. Zero, one, or more cameras can be provided, depending on implementation.

In some embodiments, user input/output interface 206 can provide output to and/or receive input from an auxiliary device such as a headset. For example, audio jack 230 can connect via an audio cable (e.g., a standard 2.5-mm or 3.5-mm audio cable) to an auxiliary device. Audio jack 230 can include input and/or output paths. Accordingly, audio jack 230 can provide audio to the auxiliary device and/or receive audio from the auxiliary device. In some embodiments, a wireless connection interface can be used to communicate with an auxiliary device.

Processing subsystem 202 can be implemented as one or more integrated circuits, e.g., one or more single-core or multi-core microprocessors or microcontrollers, examples of which are known in the art. In operation, processing subsystem 202 can control the operation of electronic device 200. In various embodiments, processing subsystem 202 can execute a variety of programs in response to program code and can maintain multiple concurrently executing programs or processes. At any given time, some or all of the program code to be executed can be resident in processing subsystem 202 and/or in storage media such as storage subsystem 204.

Through suitable programming, processing subsystem 202 can provide various functionality for electronic device 200. For example, in some embodiments, processing subsystem 202 can execute an operating system (OS) 232 and various applications (also referred to as apps) for interfacing with a host device, such as an activity monitoring app 234 that can incorporate pedometer operations (e.g., analyzing motion-sensor data to determine a step count and/or providing information such as a step count and/or distance traveled to the user). In some embodiments, some or all of these application programs can interact with a host device, e.g., by generating messages to be sent to the host device and/or by receiving and interpreting messages from the host device. In some embodiments, some or all of the application programs can operate locally to electronic device 200. For example, activity monitoring app 234 can collect and locally store activity-related information such as heart rate, step count, or the like, and such information can be presented to a user, e.g., via display 220. Activity monitoring app 234 can also communicate with other devices when such devices are available, e.g., for purposes of pedometer calibration and/or sharing activity data between devices. Examples of pedometer calibration processes are described below.

RF (radio frequency) interface 208 can allow electronic device 200 to communicate wirelessly with various host devices. RF interface 208 can include RF transceiver components 209 such as an antenna and supporting circuitry to enable data communication over a wireless medium, e.g., using Wi-Fi (IEEE 802.11 family standards), Bluetooth® (a family of standards promulgated by Bluetooth SIG, Inc.), or other protocols for wireless data communication. RF interface 208 can be implemented using a combination of hardware (e.g., driver circuits, antennas, modulators/demodulators, encoders/decoders, and other analog and/or digital signal processing circuits) and software components. In some embodiments, RF interface 208 can provide near-field communication ("NFC") capability, e.g., implementing the ISO/IEC 18092 standards or the like; NFC can support wireless data exchange between devices over a very short range (e.g., 20 centimeters or less). Multiple different wireless communication protocols and associated hardware can be incorporated into RF interface 208.

Connector interface 210 can allow electronic device 200 to communicate with various host devices via a wired communication path, e.g., using Universal Serial Bus (USB), universal asynchronous receiver/transmitter (UART), or other protocols for wired data communication. In some embodiments, connector interface 210 can provide a power port, allowing electronic device 200 to receive power, e.g., to charge an internal battery. For example, connector interface 210 can include a connector such as a mini-USB connector or a custom connector, as well as supporting circuitry.

In some embodiments, connector interface 210 and/or RF interface 208 can be used to support synchronization operations in which data is transferred from another device (e.g., a desktop computer or a mobile computing device) to electronic device 200 (or vice versa). For example, while user interface 206 can support data-entry operations, a user may find it more convenient to enter data using a different device (e.g., a tablet or smartphone) that has a larger interface (e.g., including a real or virtual alphanumeric keyboard), then transfer the data to electronic device 200 via a synchronization operation. Synchronization operations can also be used to load and/or update other types of data in storage subsystem 204, such as media items, application programs, and/or operating system programs, as well as to transfer data (e.g., activity data gathered by activity monitor app 234) from storage subsystem 204 to other devices. Synchronization operations can be performed in response to an explicit user request and/or automatically, e.g., when electronic device 200 resumes communication with a particular host device or in response to either device receiving an update to its copy of synchronized information.

Environmental sensors 214 can include various electronic, mechanical, electromechanical, optical, or other devices that provide information related to external conditions around electronic device 200. Sensors 214 in some embodiments can provide digital signals to processing subsystem 202, e.g., on a streaming basis or in response to polling by processing subsystem 202 as desired. Any type and combination of environmental sensors can be used; shown by way of example are accelerometer 242, a magnetometer 244, a gyroscope sensor 246, and a GPS receiver 248.

Some environmental sensors can provide information about the location and/or motion of electronic device 200. For example, accelerometer 242 can sense acceleration (relative to freefall) along one or more axes, e.g., using piezoelectric or other components in conjunction with associated electronics to produce a signal. Magnetometer 244 can sense an ambient magnetic field (e.g., Earth's magnetic field) and generate a corresponding electrical signal, which can be interpreted as a compass direction. Gyroscopic sensor 246 can sense rotational motion in one or more directions, e.g., using one or more MEMS (micro-electro-mechanical systems) gyroscopes and related control and sensing circuitry.

Other sensors can also be included in addition to or instead of these examples. For example, a sound sensor can incorporate microphone 226 together with associated circuitry and/or program code to determine, e.g., a decibel level of ambient sound. Temperature sensors, proximity sensors, ambient light sensors, or the like can also be included.

Physiological sensors 216 can include various electronic, mechanical, electromechanical, optical, chemical or other devices that provide information about the physiological status of a user. For instance, a pulse sensor 250 can detect a user's pulse based on pressure changes against a pressure sensor, electrical impulses, or the like. In some embodiments, pulse sensor 250 can include an optical sensor and can provide pulse oximetry data (both heart rate and oxygen content of the blood). A skin conductance sensor 252 can measure changes in the user's skin conductance that may indicate sweating, stress, or the like. Other types of sensors can also be used, including temperature sensors, ECG sensors, and so on.

Power subsystem 212 can provide power and power management capabilities for electronic device 200. For example, power subsystem 212 can include a battery 240 (e.g., a rechargeable battery) and associated circuitry to distribute power from battery 240 to other components of electronic device 200 that require electrical power. In some embodiments, power subsystem 212 can also include circuitry operable to charge battery 240, e.g., when connector interface 210 is connected to a power source. In some embodiments, power subsystem 212 can include a "wireless" charger, such as an inductive charger, to charge battery 240 without relying on connector interface 210. In some embodiments, power subsystem 212 can also include other power sources, such as a solar cell, in addition to or instead of battery 240.

In some embodiments, power subsystem 212 can control power distribution to components within electronic device 200 to manage power consumption efficiently. For example, power subsystem 212 can automatically place electronic device 200 into a "hibernation" state when sensors 216 or other sensors indicate that electronic device 200 is not being worn. The hibernation state can be designed to reduce power consumption; accordingly, user interface 206 (or components thereof), RF interface 208, connector interface 210, and/or environmental sensors 214 can be powered down (e.g., to a low-power state or turned off entirely), while sensors 216 or certain other sensors are powered up (either continuously or at intervals) to detect when a user puts on electronic device 200. As another example, in some embodiments, while electronic device 200 is being worn, power subsystem 212 can turn display 220 and/or other components on or off depending on motion and/or orientation of electronic device 200 detected by environmental sensors 214. For instance, if electronic device 200 is designed to be worn on a user's wrist, power subsystem 212 can detect raising and rolling of a user's wrist, as is typically associated with looking at a wristwatch, based on information provided by accelerometer 242. In response to this detected motion, power subsystem 212 can automatically turn display 220 and/or touch sensor 228 on; similarly, power subsystem 212 can automatically turn display 220 and/or touch sensor 228 off in response to detecting that user's wrist has returned to a neutral position (e.g., hanging down).

Power subsystem 212 can also provide other power management capabilities, such as regulating power consumption of other components of electronic device 200 based on the source and amount of available power, monitoring stored power in battery 240, generating user alerts if the stored power drops below a minimum level, and so on.

In some embodiments, control functions of power subsystem 212 can be implemented using programmable or controllable circuits operating in response to control signals generated by processing subsystem 202 in response to program code executing thereon, or as a separate microprocessor or microcontroller.

It will be appreciated that electronic device 200 is illustrative and that variations and modifications are possible. For example, electronic device 200 can include a user-operable control (e.g., a button or switch) that the user can operate to indicate when electronic device 200 is being worn. Controls can also be provided, e.g., to turn on or off display 220, mute or unmute sounds from speakers 222, etc. Electronic device 200 can include any types and combination of sensors and in some instances can include multiple sensors of a given type.

In various embodiments, a user interface can include any combination of any or all of the components described above, as well as other components not expressly described. For example, in some embodiments, the user interface can include, e.g., just a touchscreen, or a touchscreen and a speaker, or a touchscreen and a haptic device. Where the electronic device has an RF interface, a connector interface can be omitted, and all communication between the electronic device and other devices can be conducted using wireless communication protocols. A wired power connection, e.g., for charging a battery of the wearable device, can be provided separately from any data connection.

Further, while the electronic device is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 3:
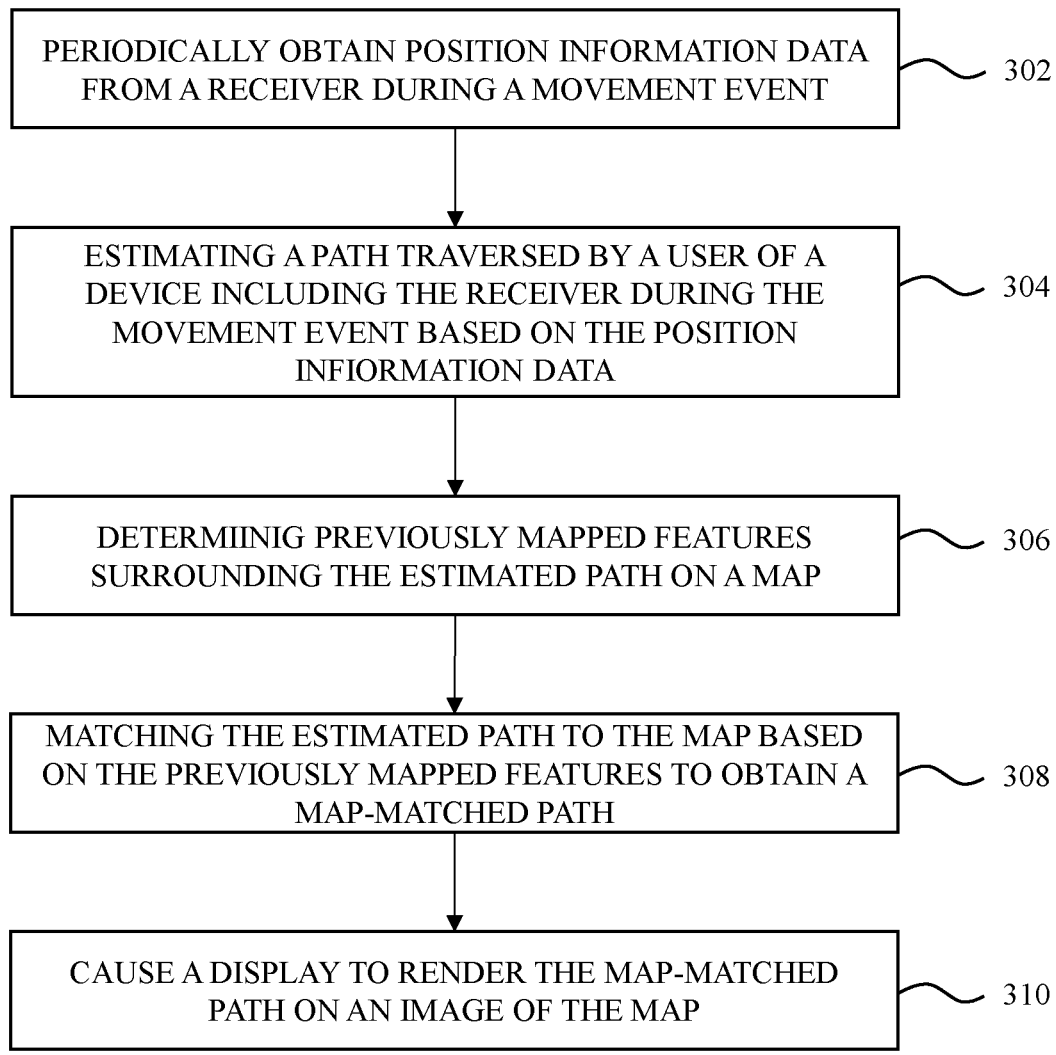
FIG. 3 is a flow diagram of an example process for smoothing the path generated based on tracking of movements of a device during an event using a map-matched smoother, in accordance with one or more implementations.

FIG. 3 is a flow diagram of an example process for tracking of movements of an electronic device during an event using a map-matched smoother, in accordance with one or more implementations.

In one or more implementations, the method may include periodically obtaining (302), at a processor, position information data from a receiver of a navigation system during a movement event. The processor may be a processor associated with a processing subsystem of an electronic device such as one depicted in FIG. 2. The navigation system may be, for example, a satellite based system such as the global positioning system (GPS). The movement event may be associated with an exercise session, and in particular, an outdoor exercise session during which a user may be engaged in an exercise or other activity of various types, such as walking, running, swimming, hiking, or bicycling. Other types of exercise and/or activities are also contemplated within the scope of the present disclosure. The user may be in possession of (e.g., carrying or wearing) a device that includes the receiver of the navigation system during the movement event. For example, if the device is an electronic device depicted in FIG. 2, the user may be wearing the device during the movement event.

Based on the position information data, a path traversed by the user of the device during the movement event is estimated (304). In one or more implementations, the path may be estimated interpolating successive positions of the device based on the position information data obtained from the receiver. The receiver may receive the position information data from a satellite in instances where the navigation system is a satellite based navigation system such as the GPS. In one or more implementations, because the position information is periodically received, the position information received at successive time points is interpolated to estimate the path traversed by the user. In some implementations, the path estimated in real-time as the receiver receives the position information data. Any algorithm known in the art for interpolating successive position points may be used. In one or more implementations, the path may then be estimated by joining together the interpolated segments over the duration of the movement event.

In instances where the navigation system is the GPS, the position information received by the receiver has a certain accuracy tolerance (e.g., variance). Thus, the successive positions may vary from the actual position of the device because of the inherent noise in the position information data received from the GPS satellites. In one or more implementations, if a path is estimated based on the raw position information data obtained from a GPS receiver, the estimated path appears as discontinuous path formed by joining discrete segments. Additionally, because of the inherent noise in the data, the path estimated using the raw position information data may vary significantly from the actual path traversed by the device.

Figure 4:
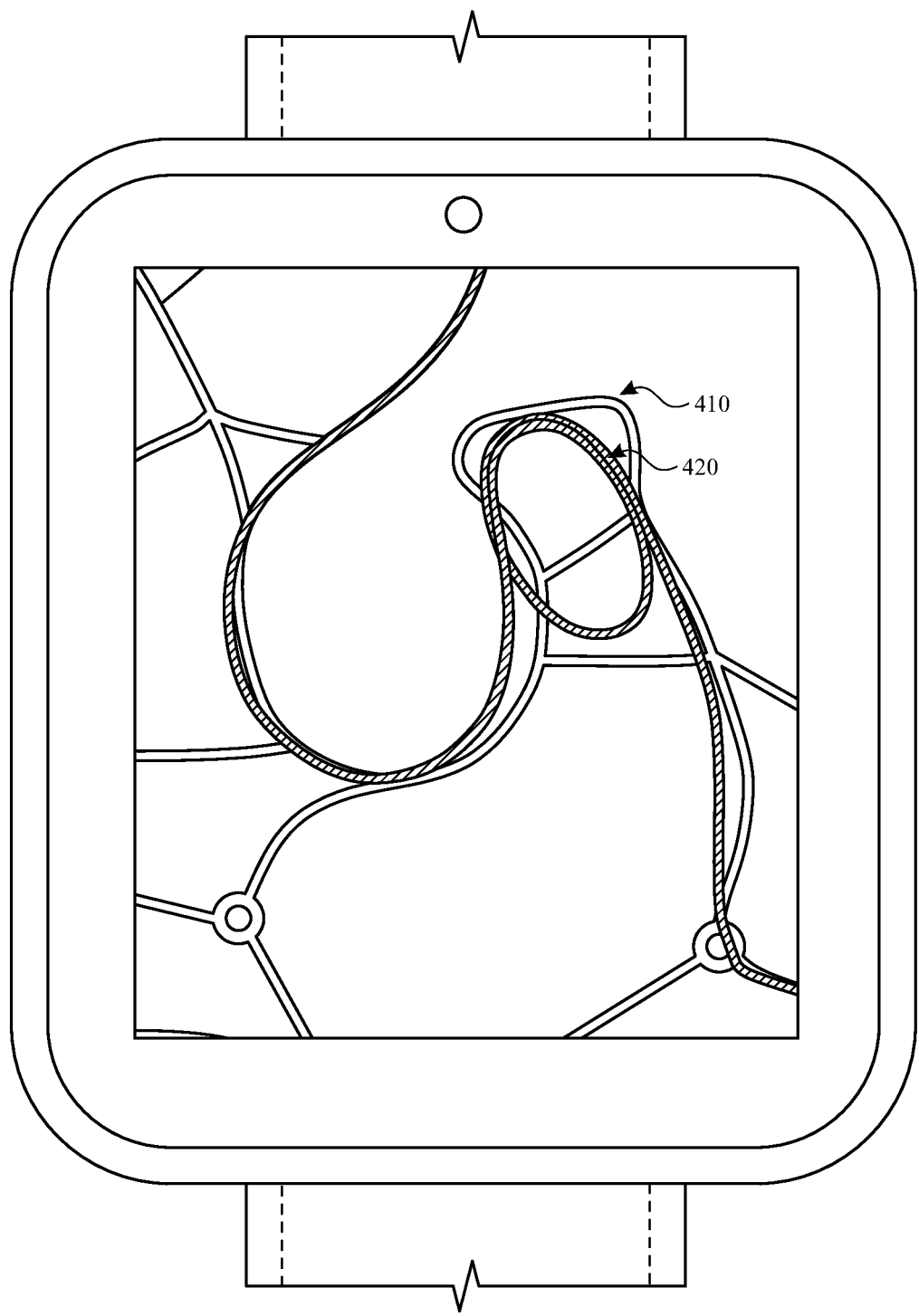
FIG. 4 shows an example of a smoothed path using a smoothing algorithm for smoothing the raw GPS data, in accordance with one or more implementations.

Once the path is estimated based on the raw position information data, a map matching process and/or a smoothing process may be used for obtaining a smooth curve for representing the path traversed by the user. FIG. 4 shows an example of a smoothed path using a smoothing algorithm for smoothing the path estimated based on the raw GPS data for the path shown in FIG. 1. As can be seen in FIG. 4, the smoothed path 420 generated directly from the raw GPS data based on fixed smoothing parameters may deviate significantly from the path estimated based on the raw position information data and thus, the actual path traversed by the device, some or all of which may more accurately lie on the trail indicated by 410. In other words, as shown in FIG. 4, a path obtained by fixed parameter smoothing may not be accurate, and thus may be improved upon using additional or alternative processing of the raw location data (e.g., the raw GPS data). Accordingly, as described herein (see, e.g., FIG. 6), one or more smoothing parameters may be adjusted based on the current state of the device at the time of tracking, such as based on a type of the movement event (e.g., a workout type) and/or the current signal environment of device.

Figure 5:
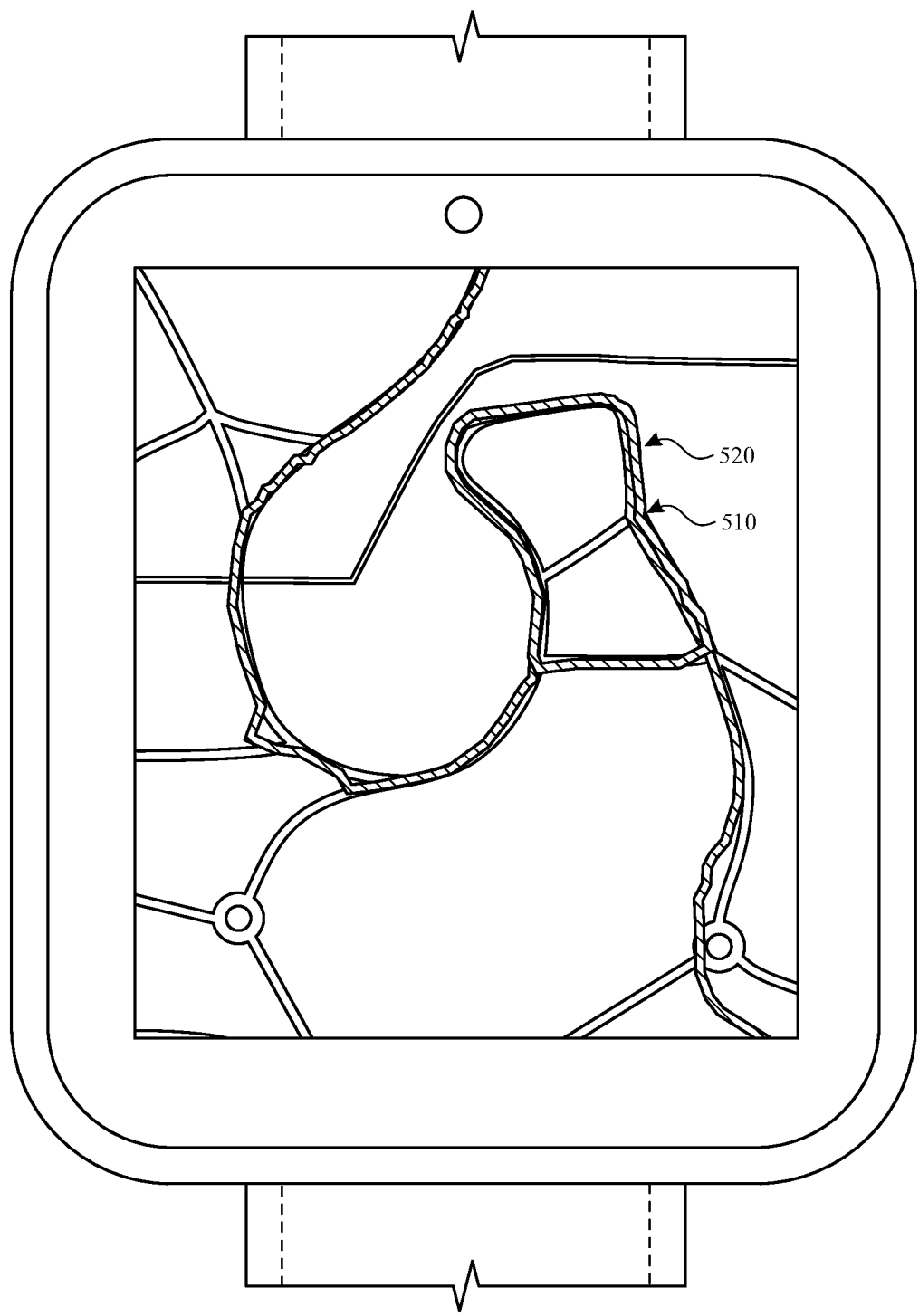
FIG. 5 shows an example of a smoothed path using a smoothing algorithm for smoothing filtered GPS data, in accordance with one or more implementations.

In some implementations, the accuracy of the estimated path can be further increased by determining (306) previously mapped features (e.g., a road, a trail, a curb, an intersection, a building, a fence, a tree-line, a waterbody, a naturally occurring geographical feature such as a cliff or a rock formation, and the like) within a proximity of the estimated path on a map, and matching (308) the estimated path to the map based on the previously mapped features to obtained a map-matched path. As illustrated in FIG. 5, the previously mapped features may be informative, in some scenarios, to determine whether the actual path traversed by the user can be in certain areas of the map. For example, if the region within the proximity of the estimated path includes a building alongside a road or a trail, it is improbable that the actual path traversed by the user passes through the building.

Thus, in order to obtain a path that more closely represents the actual path traversed by the device, in some implementations the estimated path may be adjusted, modulated and/or shifted based on a pre-mapped feature, e.g., a road or a building, among the previously mapped features to obtain a map-matched path. The previously mapped features may include any feature in a given location, the coordinates for which are previously known.

Thus, in some scenarios, the estimated path may be adjusted or shifted towards and/or away from a pre-mapped feature based on the pre-mapped feature. For example, if the previously mapped features include a road or a trail the estimated path may be adjusted or shifted towards the road or the trail to obtain a map-matched path. On the other hand, if the pre-mapped feature is a building or a waterbody, the estimated path may be adjusted or shifted away from the building or the waterbody. Additionally, the amount by which the estimated path is shifted or adjusted may depend on the pre-mapped feature, in particular, in scenarios where multiple pre-mapped features are determined.

The shifting of the estimated path to obtain the map-matched path may be performed, in some implementations, on the estimated path obtained from raw position information data. In some implementations, the estimated path is obtained by smoothing a path obtained from raw position information data. In some implementations, the estimated path is obtained using filtered position information data using filtering as described herein. In some implementations, the estimated path is obtained by smoothing a path obtained from filtered position information data.

In some scenarios, the map-matched path is obtained by shifting a particular position on the estimated path to match a position on a pre-mapped feature such as a road or a trail, the position on the pre-mapped feature to which the position of the estimated path is shifted may be based on an estimated error in the raw or filtered position information data. The estimated error may be based on the noise in the signal carrying the position information data. Thus, the position on the estimated path may be shifted to the position on the pre-mapped feature when, for example, the distance between the position on the estimated path and the position on the pre-mapped feature is less than a threshold distance, which is based on the estimated error (e.g., the threshold distance may be increased for higher estimated errors and decreased for lower estimated errors).

The estimated error, in some implementations, may be determined based on the characteristics of the navigation signal carrying the position information data. In instances where the position information data is based on the GPS, the error in the position information data may be higher in urban locations with tall buildings. Similarly, the error in the position information data may be higher where the path traversed by the user is intermittently covered, e.g., by overpasses or dense tree cover, causing the receiver to intermittently lose the line-of-sight to the satellite or otherwise causing the received signal quality to degrade. Thus, in some implementations, the threshold distance may be proportional or inversely proportional to the noise, (e.g., rms noise) in the GPS signal. For example, a smaller threshold distance may be used in scenarios where the received signal quality is good and a larger threshold distance may be used in scenarios where the received signal quality is bad.

In one or more implementations, the map-matched path illustrated in FIG. 5 can be provided to an adjustable-parameter smoother. In one or more implementations, a type of the motion event (e.g., a type such as a run, a walk, a hike, a bicycle ride, etc., which can be input by the user of the device or inferred by the device, such as by using IMU and/or GPS data) and/or one or more characteristics of the GPS signal (e.g., a signal environment such as a high noise signal environment, a low noise signal environment, an urban signal environment, a rural signal environment, etc.) can also be provided to the adjustable-parameter smoother and used to adjust the smoothing parameters (e.g., the process noise or other parameter of a fixed-lag or other smoothing filter). The adjustable-parameter smoother may then smooth the map-matched path and output a smooth map-matched path, which can be rendered for display. In some scenarios, the threshold distance used may be dependent on the type of workout or exercise being undertaken by the user. For example, if the user is moving relatively quickly, e.g., in case of a bicycle ride, the threshold distance may be smaller compared to when the user is walking or jogging.

Figure 6:
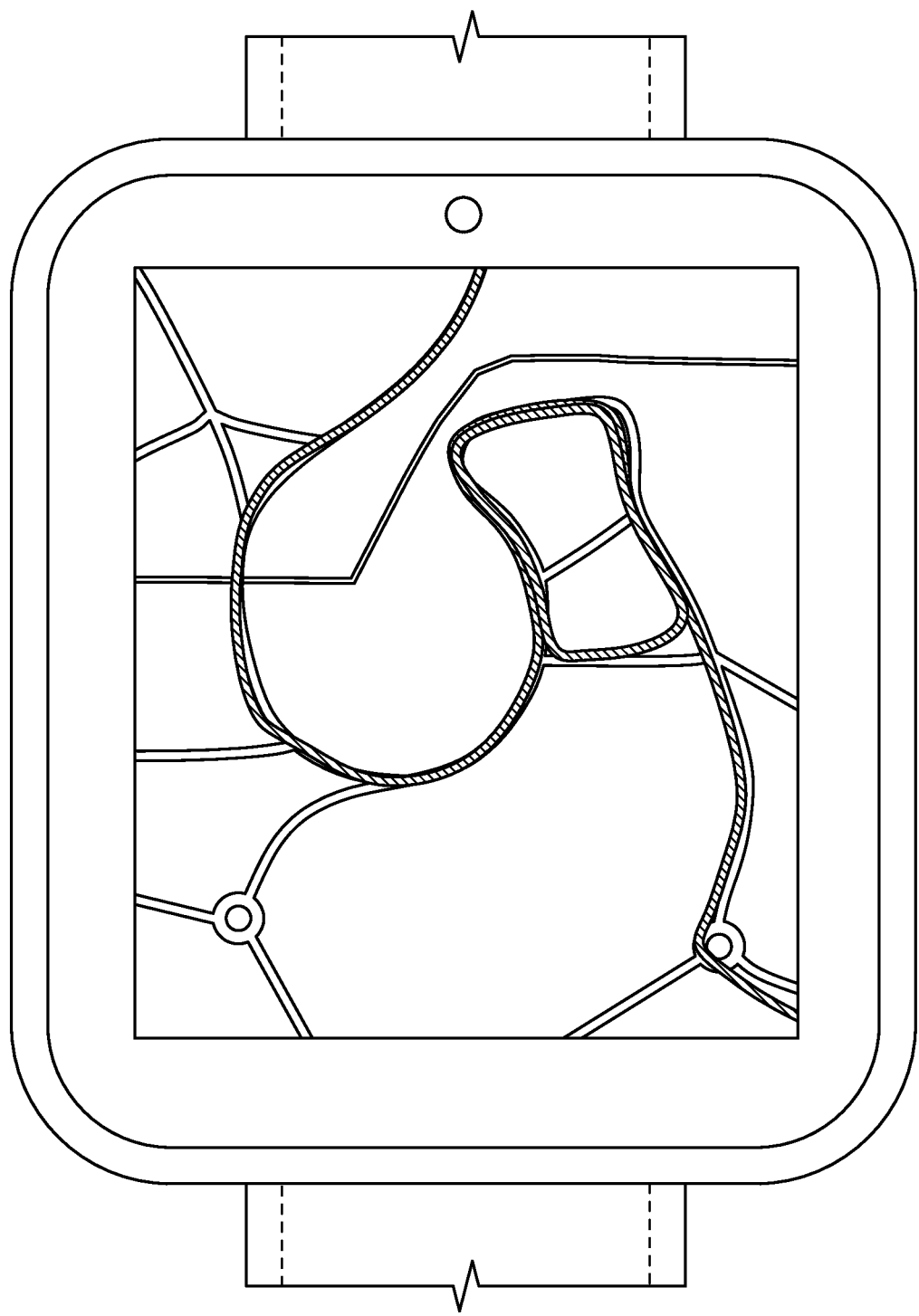
FIG. 6 shows an example of a smoothed path using a map-matched smoothing algorithm, in accordance with one or more implementations.

In some implementations, a display device may be caused (310) to render the map-matched path on an image of the map. FIG. 6 shows an example of a smoothed path using a map-matched smoothing process as described herein, in accordance with one or more implementations.

In implementations where the position information data is received from one or more GPS satellites, it will be appreciated that the frequency of receiving the position information data is high, and thus, the processing the position information data may require substantial computational resources. Thus, in order to reduce the computational load and/or reduce the time for rendering the map-matched path on the image of the map, some data processing may be performed during the movement event while other data processing may be performed following the movement event. For example, the estimation of the path traversed by the user based on raw position information data may be performed real-time as the data is received. Similarly, in some implementations, the raw data may be filtered as the data obtained during the movement event. On the other hand, because obtaining the map-matched path may be performed on an estimated path, the matching of the estimated path to the pre-mapped feature may be performed after the movement event has ended, and/or when the user wishes to render the map-matched path on the map.

In one or more implementations, the method may further include performing a smoothing process prior to matching the estimated path to the map following the completion of the movement event. In such implementations, the user of the device can input the type of the exercise or workout and the threshold distance between the actual path and the estimated path during matching process can be adjusted based on the type of the exercise or workout. In some implementations, the device (e.g., the processor of the device) can infer the type of exercise or workout based on the parameters of the movement event (e.g., pace of movement), and accordingly adjust the threshold distance.

The map-matched path obtained using the methods described herein may closely represent the actual path traversed by the user, and thus may most accurately represent the distance traversed by the user during the movement event. Thus, in some implementations, the method may further include estimating a distance traversed by the user based on the map-matched path.

As described above, one aspect of the present technology is to provide for a smoother rendering of a route on a map following an event, e.g., a workout session, during which a movement of a user may be tracked so as to eliminate noise from raw position information data (e.g., raw GPS data) when visualizing the route used during the event. The smoothing of the route may be achieved by post-processing raw position information data. Post-processing may be performed by matching the route to a map based on previously mapped features such as roads, trails, fences, foliage, waterbodies, and buildings. Additionally, the amount of smoothing performed for rendering of the route may be based on a signal environment during the event. For example, if the GPS signal is intermittently available during the event (e.g., in urban environments with tall buildings or where the path is under a heavy tree cover), a smaller threshold distance may be used for matching the route to a pre-mapped feature. A distance traversed during the event may be calculated based on the smoothed route rather than based on raw GPS data to reduce inaccuracy caused by noise in the raw GPS data. A particle filter may be used to reduce noise from the raw GPS data prior to smoothing the route so as to reduce the post-processing time.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of accessing improved route tracking, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use and/or access of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, improved route tracking can be performed based on non-personal information data or a bare minimum amount of personal information, such as the content being requested by the device associated with a user, other non-personal information available to the application obtaining the content or other data, or publicly available information.

Figure 7:
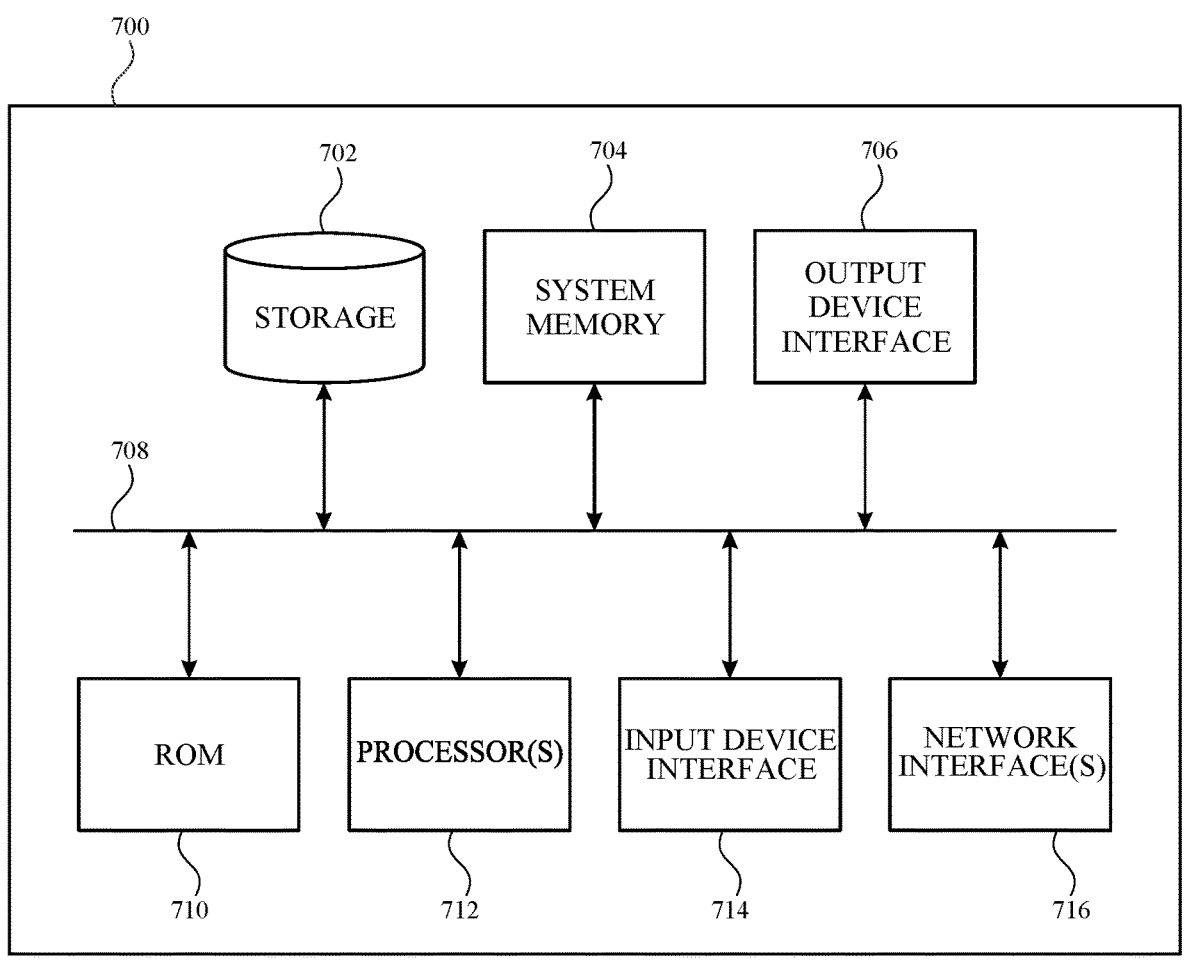
FIG. 7 illustrates an electronic system with which one or more implementations of the subject technology may be implemented.

FIG. 7 illustrates an electronic system 700 with which one or more implementations of the subject technology may be implemented. The electronic system 700 can be, and/or can be a part of, the electronic device 200 shown in FIG. 2. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes through the one or more network interface(s) 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

In accordance with various aspects of the subject disclosure, a method may include periodically obtaining, at a processor, position information data from a receiver of a navigation system during a movement event; estimating, by the processor, a path traversed by a user of a device comprising the receiver during the movement event based on the position information data; determining, by the processor, previously mapped features within a proximity of the estimated path on a map; matching, by the processor, the estimated path to a pre-mapped feature on the map based on the previously mapped features to obtain a map-matched path; and causing, by the processor, a display device to render the map-matched path on an image of the map.

In accordance with various aspects of the subject disclosure, a non-transitory computer-readable medium is provided that includes instructions, which when executed by at least one computing device, cause the at least one computing device to periodically obtain position information data from a receiver of a navigation system during an event; estimate a path traversed by a user of a device comprising the receiver during the event based on the position information data; determine previously mapped features within a proximity of the estimated path on a map; match the estimated path to the map based on the previously mapped features to obtain a map-matched path; and cause a display device to render the map-matched path on an image of the map.

In accordance with various aspects of the subject disclosure, a device may include a receiver for a navigation system; a display; and a processor. The processor is configured to periodically obtain position information data from the receiver during a movement event; estimate a path traversed by a user of the device during the movement event based on the position information data; determine previously mapped features within a proximity of the estimated path on a map; match the estimated path to the map based on the previously mapped features to obtain a map-matched path; and cause the display to render the map-matched path on an image of the map.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
    periodically obtaining, at a processor, position information data from a receiver of a navigation system during a movement event;
    estimating, by the processor, a path traversed by a user of a device comprising the receiver during the movement event based on the position information data;
    determining, by the processor, one or more previously mapped features within a proximity of the estimated path on a map;
    matching, by the processor and after the movement event has ended, the estimated path to the map based on the one or more previously mapped features to obtain a map-matched path; and
    causing, by the processor, a display device to render the map-matched path on an image of the map.

2. The method of claim 1, further comprising filtering the position information data prior to estimating the path traversed by the user.

3. The method of claim 2, wherein the filtering is performed using a particle filter.

4. The method of claim 1, wherein the matching comprises shifting the estimated path based on a pre-mapped feature among the one or more previously mapped features if a distance between the estimated path and the pre-mapped feature is less than a threshold distance.

5. The method of claim 4, wherein the pre-mapped feature includes one or more of a road, a trail, a tree or a tree-line, a fence, and a building.

6. The method of claim 4, further comprising determining the threshold distance based on characteristics of a signal including the position information data received by the receiver and/or a characteristic of the movement event.

7. The method of claim 1, further comprising estimating a distance traversed by the user based on the map-matched path.

8. The method of claim 1, wherein the estimating the path based on the position information data is performed in real-time.

9. A non-transitory computer-readable medium is provided that includes instructions, which when executed by at least one computing device, cause the at least one computing device to:
    periodically obtain position information data from a receiver of a navigation system during an event;
    filter the position information data;
    estimate a path traversed by a user of a device comprising the receiver during the event based on the filtered position information data;
    determine one or more previously mapped features within a proximity of the estimated path on a map;
    match the estimated path to the map based on the one or more previously mapped features to obtain a map-matched path; and
    cause a display device to render the map-matched path on an image of the map.

10. The non-transitory computer-readable medium of claim 9, wherein the instructions further cause the at least one computing device to:
    estimate a distance traversed by the user based on the map-matched path.

11. The non-transitory computer-readable medium of claim 9, wherein the instructions further cause the at least one computing device to match the estimated path to the map to obtain the map-matched path after the event has ended.

12. The non-transitory computer-readable medium of claim 9, wherein the instructions further cause the at least one computing device to estimate the path based on the position information data in real-time.

13. The non-transitory computer-readable medium of claim 9, wherein the instructions further cause the at least one computing device to shift the estimated path based on a pre-mapped feature among the one or more previously mapped features if a distance between the estimated path and the pre-mapped feature is less than a threshold distance.

14. A device comprising:
    a receiver for a navigation system;
    a display; and
    a processor configured to:
        periodically obtain position information data from the receiver during a movement event;
        estimate a path traversed by a user of the device during the movement event based on the position information data;

determine one or more previously mapped features within a proximity of the estimated path on a map;

match the estimated path to the map based on the one or more previously mapped features to obtain a map-matched path by shifting the estimated path based on a pre-mapped feature among the one or more previously mapped features if a distance between the estimated path and the pre-mapped feature is less than a threshold distance; and cause the display to render the map-matched path on an image of the map.

15. The device of claim 14, wherein the processor is further configured to filter the position information data using a particle filter prior to estimating the path traversed by the user.

16. The device of claim 15, wherein the pre-mapped feature includes one or more of a road, a trail, a tree or a tree-line, a fence, and a building.

17. The device of claim 15, wherein the threshold distance is determined based on characteristics of a signal including the position information data received by the receiver and/or a characteristic of the movement event.

18. The device of claim 14, wherein the processor is further configured to estimate a distance traversed by the user based on the map-matched path.

19. The device of claim 14, wherein the processor is configured to estimate the path based on the position information data in real-time.

20. The device of claim 14, wherein the processor is configured to match the estimated path to the map to obtain the map-matched path after the movement event has ended.

* * * * *